(12) United States Patent
Urase et al.

(10) Patent No.: US 8,763,463 B2
(45) Date of Patent: Jul. 1, 2014

(54) ULTRASONIC SENSOR

(75) Inventors: Hiroshi Urase, Matsuzaka (JP); Yasushi Nagano, Ise (JP)

(73) Assignee: Panasonic Corporation, Osaka (JP)

( * ) Notice: Subject to any disclaimer, the term of this patent is extended or adjusted under 35 U.S.C. 154(b) by 605 days.

(21) Appl. No.: 12/999,440

(22) PCT Filed: Jun. 15, 2009

(86) PCT No.: PCT/JP2009/060874
§ 371 (c)(1),
(2), (4) Date: Dec. 16, 2010

(87) PCT Pub. No.: WO2009/154170
PCT Pub. Date: Dec. 23, 2009

(65) Prior Publication Data
US 2011/0088479 A1 Apr. 21, 2011

(30) Foreign Application Priority Data

Jun. 20, 2008 (JP) ................................. 2008-161676

(51) Int. Cl.
*G01N 29/24* (2006.01)
(52) U.S. Cl.
USPC ........................................... 73/632; 73/866.5
(58) Field of Classification Search
USPC .......... 73/632, 431, 866.5; 310/338, 344, 348
See application file for complete search history.

(56) References Cited

U.S. PATENT DOCUMENTS

| 5,814,731 | A | * | 9/1998 | Alexander et al. | ............... 73/644 |
| 2006/0023570 | A1 | * | 2/2006 | Betts et al. | ............... 367/88 |
| 2007/0028693 | A1 | * | 2/2007 | Komninos | ............... 73/587 |
| 2007/0237031 | A1 | | 10/2007 | Kawashima et al. | |

FOREIGN PATENT DOCUMENTS

| DE | 4428335 | 2/1996 |
| DE | 19752921 | 6/1999 |
| JP | 62-173081 U | 11/1987 |
| JP | 03-064842 U | 6/1991 |
| JP | 2003-214902 A | 7/2003 |
| JP | 2007-281999 A | 10/2007 |
| JP | 3991936 B2 | 10/2007 |
| JP | 2008-139032 A | 6/2008 |

OTHER PUBLICATIONS

Wikipedia: Welding, Online encyclopaedia, Version 19.06.2008.
112009001490.9, Oct. 10, 2013, German Office Action.

* cited by examiner

*Primary Examiner* — Peter Macchiarolo
*Assistant Examiner* — Rose M Miller
(74) *Attorney, Agent, or Firm* — Workman Nydegger

(57) ABSTRACT

An ultrasonic sensor that has a simplified structure, ensures high water resistance, and shortens the manufacturing time. An ultrasonic sensor includes a transducer, an electronic circuit substrate on which an electronic circuit is arranged to process an ultrasonic signal transmitted and received via the transducer, and a housing including a substrate retainer that retains the electronic circuit board. The substrate retainer includes a lid welded to an open portion thereof to hermetically seal the substrate retainer against the entry of a liquid.

6 Claims, 2 Drawing Sheets

ULTRASONIC SENSOR

TECHNICAL FIELD

The present invention relates to an ultrasonic sensor installed in a vehicle to detect an obstacle or the like.

BACKGROUND ART

An ultrasonic sensor for a vehicle is normally arranged on a bumper or front grille, at which the likelihood of becoming wet is high and the vibration received is strong. Thus, in the prior art, a typical ultrasonic sensor uses a hydrophobic and flexible filler (silicon or the like) to fill the housing, which accommodates an electronic circuit substrate or the like. This ensures the required water resistance and vibration resistance (e.g., refer to patent literature 1).

However, the filling of a filler as in the prior art increases weight and cost. Additionally, due to the presence of the filler, the electronic circuit substrate has a tendency to become deformed. This may form cracks in portions soldered to the electronic components on the electronic circuit substrate. There is also a problem in that detection area property of the sensor may differ before and after the filling of the filler. Factors that deform the electronic circuit include, for example, external load resulting from the thermal expansion and contraction of the filler. An example of a differed detection area property would be a narrowed detection area. Moreover, much time is required to dry the filler. From such viewpoints, many improvements may be made.

PRIOR ART LITERATURE

Patent Literature 1: Japanese Patent No. 3991936

SUMMARY OF THE INVENTION

The present invention provides an ultrasonic sensor that has a simplified structure, ensures high water resistance, and shortens the manufacturing time.

One aspect of the present invention is an ultrasonic sensor including a transducer, an electronic circuit substrate on which an electronic circuit is arranged to process an ultrasonic signal transmitted and received via the transducer, and a housing including a substrate retainer that retains the electronic circuit board. The substrate retainer includes a lid welded to an open portion thereof to hermetically seal the substrate retainer against the entry of a liquid.

DETAILED DESCRIPTION OF THE EMBODIMENTS

One embodiment of the present invention will now be discussed with reference to the drawings.

Figure 1:
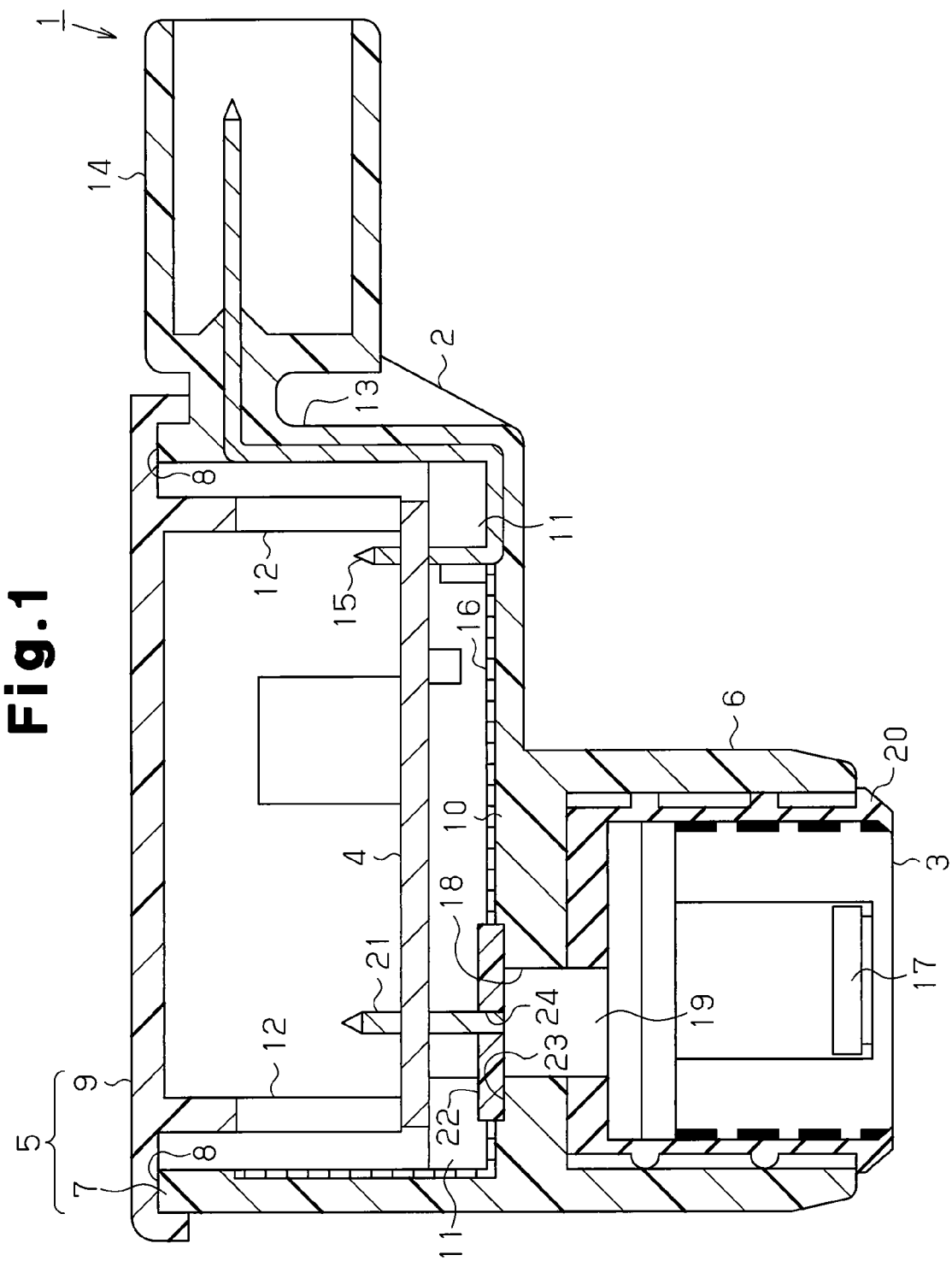
FIG. 1 is a schematic diagram showing an ultrasonic sensor of one embodiment.

As shown in FIG. 1, an ultrasonic sensor 1 of the present embodiment includes a housing 2 accommodating a microphone 3 and an electronic circuit substrate 4. The microphone 3 serves as a transducer. The electronic circuit substrate 4 processes ultrasonic signals transmitted and received via the microphone 3.

In detail, the housing 2 of the present embodiment includes a substrate retainer 5 and a microphone retainer 6. The substrate retainer 5 is formed to have the shape of a low box. The microphone retainer 6 is arranged adjacent to the substrate retainer 5 and serves as a transducer retainer.

In the present embodiment, the substrate retainer 5 includes a substrate retainer body 7, which is tubular and has a closed bottom. The substrate retainer body 7 has an open portion 8 closed by a planar lid 9. The lid 9 of the present embodiment is formed from a light transmissive material, and the substrate retainer body 7 is formed from a light absorptive material. In the present embodiment, the entire circumference of the lid 9 is laser welded to the open portion 8 of the substrate retainer body 7 to hermetically seal the interior of the substrate retainer 5 against the entry of liquids.

Figure 2:
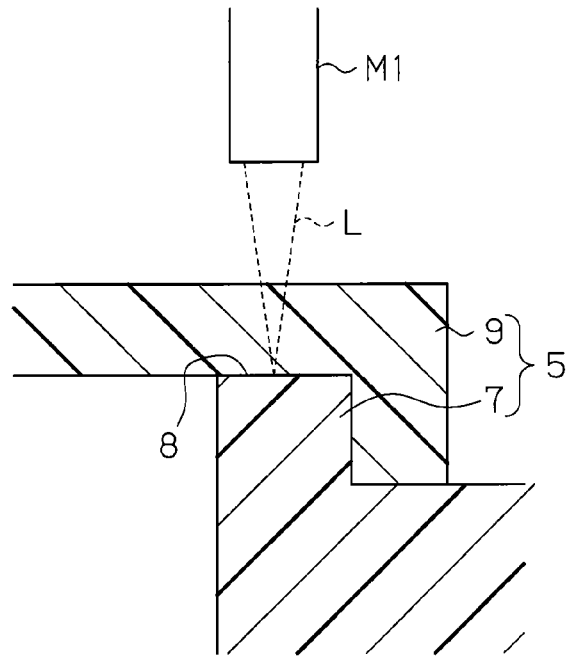
FIG. 2 is an explanatory diagram showing a laser welding operation.

More specifically, as shown in FIG. 2, a laser machine M1 emits a laser beam L, which is transmitted through the lid 9 and absorbed by the substrate retainer body 7. This generates heat that forms a melt pool around the boundary of the lid 9 and substrate retainer body 7. Solidification of the melt pool joins together the lid 9 and the substrate retainer body 7.

The substrate retainer body 7 has a bottom portion 10 including a plurality of support ribs 11, which project into the substrate retainer body 7. The lid 9 includes a plurality of pressing ribs 12, which extend into the substrate retainer body 7 when the lid 9 is coupled to the open portion 8. The electronic circuit substrate 4 is supported by the support ribs 11 in the substrate retainer 5 to be generally parallel to the bottom portion 10. Further, the electronic circuit substrate 4 is pressed by the pressing ribs 12, which extend from the lid 9 and serve as support members. Thus, the electronic circuit substrate 4 is held between the pressing ribs 12 and the support ribs 11. This restricts movement of the electronic circuit substrate 4 in the pressing direction (vertical direction as viewed in the drawing).

The substrate retainer body 7 has a side wall 13 on which a power feed unit 14 is arranged. A power feed terminal plate 15 embedded in the power feed unit 14 has one end projecting into the substrate retainer 5. In the present embodiment, the power feed terminal plate 15 is insert-molded integrally with the housing 2 together with a shield 16, which is embedded in the bottom portion 10 and side wall 13 of the substrate retainer body 7. The electronic circuit substrate 4 is soldered to the power feed terminal plate 15 to be supplied with power from a connector (not shown) connected to the power feed unit 14.

The cylindrical microphone retainer 6 extends from the bottom portion 10 of the substrate retainer body 7 so that the axis of the microphone retainer 6 is generally orthogonal to the bottom portion 10. The microphone 3 is retained and supported in the microphone retainer 6 so that its transducer unit 17 faces outward.

More specifically, in the present embodiment, the bottom portion 10 of the substrate retainer body 8 includes a communication bore 18, which serves as a second open portion communicating the substrate retainer 5 and the microphone retainer 6. A rod-shaped lead terminal 19 is formed on the end of the microphone 3 that is opposite to the transducer unit 18 (upper end as viewed in FIG. 1). The microphone 3 is arranged in the microphone retainer 6 so that the lead terminal 19 is arranged in the communication bore 18. In the present embodiment, a cushioning material 20, which surrounds the microphone 3, is arranged between the microphone 3 and the microphone retainer 6. A lead terminal plate 21, which extends from the lead terminal 19 into the substrate retainer 5, is soldered to the electronic circuit substrate 4. This electrically connects the microphone 3 to the electronic circuit substrate 4.

In further detail, in the present embodiment, a weld plate 22, which forms a second lid, closes the communication bore 18 from the inner side of the substrate retainer 5. The lead terminal plate 21 extending from the lead terminal 19 extends through the weld plate 22 and into the substrate retainer 5.

Specifically, in the same manner as the lid 9, laser welding is performed to join the weld plate 22 with an open portion 23 of the communication bore 18 that is formed in the substrate retainer 5. The weld plate 22 contacts a distal end of the lead terminal 19. The lead terminal 19 is laser welded and joined with the weld plate 22. In the present embodiment, this seals the communication bore 18 and hermetically seals a through hole 24 of the lead terminal 19 against the entry of liquids.

In the present embodiment, the weld plate 22 is laser welded to the open portion 23 of the communication bore 18 and the lead terminal 19 through the open portion 8 of the substrate retainer body 7. Then, after arranging the electronic circuit substrate 4 in the substrate retainer body 7, the lid 9, which is coupled to the open portion 8, is welded to the open portion 8. Thus, the direction in which the laser beam is emitted is generally the same whenever laser welding is performed.

The ultrasonic sensor 1 has the advantages described below.

(1) The substrate retainer 5 includes the substrate retainer body 7, which is tubular and has a closed bottom, and the lid 9, which is coupled to the open portion 8. The lid 9 is laser welded to the open portion 8 of the substrate retainer body 7 to hermetically seal the interior of the substrate retainer 5 against the entry of liquids.

Thus, the gap between the open portion 8 of the substrate retainer body 8 and the lid 9 is easily sealed in an ensured manner with a simple structure. This allows for elimination of a filler that fills the substrate retainer 5 and thereby lowers weight and cost. Further, changes in the detection area property that would occur before and after the filling of the filler are avoided, and external load that would be produced by thermal expansion and contraction does not act on the electronic circuit substrate 4. Moreover, filler drying does not have to be performed. This drastically shortens the manufacturing time.

(2) The electronic circuit substrate 4 is supported by the support ribs 11 formed on the bottom portion 10 of the substrate retainer body 7. Further, the electronic circuit substrate 4 is pressed by the pressing ribs 12 extending from the lid 9. This holds the electronic circuit substrate 4 between the pressing ribs 12 and the support ribs 11.

Thus, movement of the electronic circuit substrate 4 in the pressing direction is easily restricted with a simple structure.

(3) The microphone retainer 6 is arranged adjacent to the substrate retainer 5. Further, the electronic circuit board 4 is soldered with the lead terminal plate 21 of the microphone 3, which extends through and into the substrate retainer 5 from the microphone retainer 6.

This allows for the lead terminal plate 21, which is soldered for connection, to support the electronic circuit substrate 4. As a result, in comparison to a connection using a lead wire as in the prior art, a higher level of vibration resistance may be ensured.

(4) The communication bore 18, which communicates the substrate retainer 5 and the microphone retainer 6, is formed in the bottom portion 10 of the substrate retainer body 7. Further, the weld plate 22 closes the communication bore 18.

The lead terminal plate 21 extends through the weld plate 22 into the substrate retainer 5. This facilitates the extension of the lead terminal plate 21 into the substrate retainer 5.

(5) The weld plate 22 is laser welded from the inner side of the substrate retainer 5 and joined to the open portion 23 of the communication bore 18, which is formed in the substrate retainer 5.

This easily seals the gap between the open portion 23 of the communication bore 18 and the weld plate 22 with a simple structure. Further, the laser emission direction conforms to the laser welding of the lid 9. This allows for a simplified and facilitated welding operation and shortens the welding operation time.

(6) The through hole 24 formed in the weld plate 22 to receive the lead terminal plate 21 is hermetically sealed against the entry of liquids by welding the lead terminal 19, from which the lead terminal plate 21 extends, and the weld plate 22.

This facilitates and ensures the sealing of the through hole 24 with a simple structure. Further, the laser emission direction conforms to other laser welding operations. This allows for a simplified and facilitated welding operation and shortens the welding operation time.

The present embodiment may be modified as described below.

Figure 3:
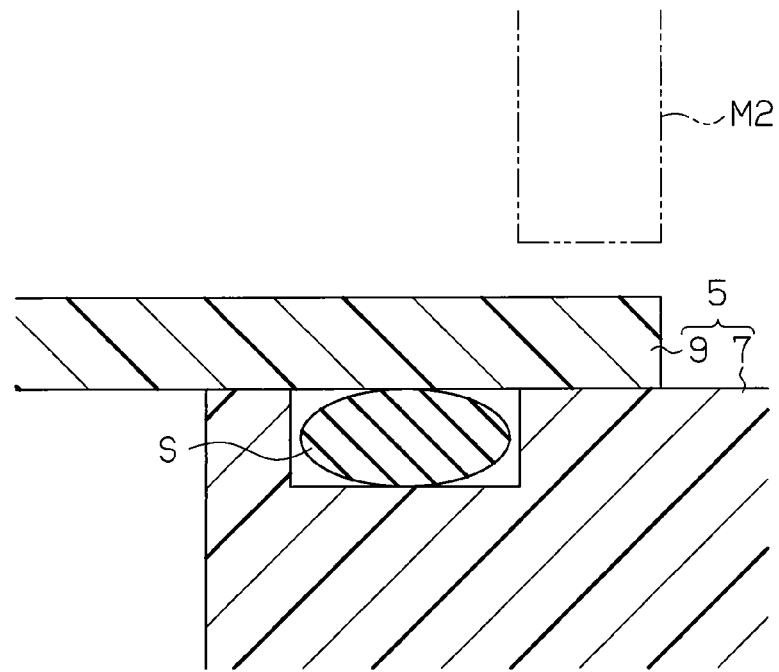
FIG. 3 is an explanatory diagram showing an ultrasonic welding operation.

The welding of the lid 9 and the weld plate 22 is not limited to the laser welding shown in FIG. 2. Ultrasonic welding may be performed instead as shown in FIG. 3. In the drawing, the double-dotted line represents an ultrasonic machine M2 (horn).

Further, as shown in FIG. 3, a seal S may be arranged between the lid 9 and the open portion 8. In the same manner, although not shown in the drawing, a seal S may be arranged between the weld plate 22 and the open portion 23. This further ensures sealing. A structure using such a seal S may be applied when performing laser welding.

When performing each welding operation described above, an adhesive material (agent) may also be used.

The invention claimed is:

1. An ultrasonic sensor comprising:
    a housing, the housing including
        a substrate retainer including an open portion and a bottom portion located opposite to the open portion,
        a transducer retainer arranged adjacent to the substrate retainer, and
        a communication bore arranged to open from the bottom portion of the substrate retainer and to communicate between the substrate retainer and the transducer retainer;
    a transducer retained in the transducer retainer;
    an electronic circuit substrate retained in the substrate retainer and including an electronic circuit for processing an ultrasonic signal transmitted and received via the transducer;
    a first lid laser-welded to the open portion of the substrate retainer to hermetically seal the substrate retainer against the entry of a liquid; and
    a second lid arranged inside the substrate retainer and laser-welded to the bottom portion of the substrate retainer to close the communication bore,
    wherein the first lid and the second lid are arranged so that a direction in which a laser beam is emitted in laser welding of the first lid is the same as that in laser welding of the second lid.

2. The ultrasonic sensor according to claim 1, further comprising:
    a seal arranged between the first lid and the open portion.

3. The ultrasonic sensor according to claim 1, further comprising:
 a support member pressing and supporting the electronic circuit substrate retained in the substrate retainer by laser-welding the first lid.

4. The ultrasonic sensor according to claim 1, wherein;
 the transducer includes a lead terminal plate extending from the transducer; and
 the lead terminal plate is arranged in the substrate retainer through the transducer retainer and soldered to the electronic circuit substrate, which is retained in the substrate retainer.

5. The ultrasonic sensor according to claim 4,
 wherein the lead terminal plate extends through the second lid and is arranged in the substrate retainer.

6. The ultrasonic sensor according to claim 5, wherein the second lid includes a through hole formed so that the lead terminal plate extends through the second lid;
 the transducer includes a lead terminal on which the lead terminal plate is arranged; and
 the second lid is welded to both the inside of the substrate retainer and the lead terminal.

* * * * *